US010235290B2

United States Patent
Blagodurov et al.

(10) Patent No.: US 10,235,290 B2
(45) Date of Patent: Mar. 19, 2019

(54) HOT PAGE SELECTION IN MULTI-LEVEL MEMORY HIERARCHIES

(71) Applicant: Advanced Micro Devices, Inc., Sunnyvale, CA (US)

(72) Inventors: Sergey Blagodurov, Bellevue, WA (US); Gabriel H. Loh, Bellevue, WA (US); Mitesh R. Meswani, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 109 days.

(21) Appl. No.: 14/752,408

(22) Filed: Jun. 26, 2015

(65) Prior Publication Data
US 2016/0378655 A1 Dec. 29, 2016

(51) Int. Cl.
*G06F 12/02* (2006.01)
*G06F 12/0811* (2016.01)
*G06F 12/0897* (2016.01)
*G06F 12/1027* (2016.01)

(52) U.S. Cl.
CPC ...... *G06F 12/0811* (2013.01); *G06F 12/0897* (2013.01); *G06F 12/1027* (2013.01); *Y02D 10/13* (2018.01)

(58) Field of Classification Search
USPC ......................................... 711/112
See application file for complete search history.

(56) References Cited

U.S. PATENT DOCUMENTS

2012/0272029 A1\* 10/2012 Zhang ................. G06F 11/3466
711/165
2015/0106582 A1\* 4/2015 Mai ....................... G06F 3/0649
711/165

OTHER PUBLICATIONS

Jevdjic, et al., "Die-Stacked DRAM Caches for Servers: Hit Ratio, Latency, or Bandwidth? Have it All with Footprint Cache", Proceedings of the 40th Annual International Symposium on Computer Architecture, Jun. 23-27, 2013, 12 pages, ACM, New York, NY, USA.
Loh, et al., "Efficiently Enabling Conventional Block Sizes for Very Large Die-stacked DRAM Caches", Proceedings of the 44th Annual IEEE/ACM International Symposium on Microarchitecture, Dec. 3-7, 2011, 11 pages, ACM, New York, NY, USA.

(Continued)

*Primary Examiner* — Charles Rones
*Assistant Examiner* — Ryan Dare
(74) *Attorney, Agent, or Firm* — Meyertons Hood Kivlin Kowert and Goetzel PC; Rory D. Rankin

(57) ABSTRACT

Systems, apparatuses, and methods for sorting memory pages in a multi-level heterogeneous memory architecture. The system may classify pages into a first "hot" category or a second "cold" category. The system may attempt to place the "hot" pages into the memory level(s) closest to the systems' processor cores. The system may track parameters associated with each page, with the parameters including number of accesses, types of accesses, power consumed per access, temperature, wearability, and/or other parameters. Based on these parameters, the system may generate a score for each page. Then, the system may compare the score of each page to a threshold. If the score of a given page is greater than the threshold, the given page may be designated as "hot". If the score of the given page is less than the threshold, the given page may be designated as "cold".

20 Claims, 12 Drawing Sheets

(56) References Cited

OTHER PUBLICATIONS

Shankland, Stephen, "IBM leaps two hurdles for next-gen memory", CNET.com, Jun. 29, 2011, http://www.cnet.com/news/ibm-leaps-two-hurdles-for-next-gen-memory/, 6 pages, [Retrieved Apr. 6, 2015].
Clark, Jack, "Intel: Non-volatile memory shift means chips need an overhaul", ZDNel, Sep. 13, 2012, http://www.zdnet.com/article/intel-non-volatile-memory-shift-means-chips-need-an-overhaul/, 8 pages. [Retrieved Apr. 6, 2015].

\* cited by examiner

HOT PAGE SELECTION IN MULTI-LEVEL MEMORY HIERARCHIES

The invention described herein was made with government support under prime contract number DE-AC52-07NA27344, subcontract number B600716, with Lawrence Livermore National Laboratory awarded by the United States Department of Energy. The United States Government has certain rights in the invention.

BACKGROUND

Technical Field

Embodiments described herein relate to data processing devices and more particularly, to sorting memory pages in a multi-level memory hierarchy.

Description of the Related Art

Certain emerging memory technologies (e.g., die-stacked memory) have the potential to significantly attack the memory wall problem. In particular, placing one or more three-dimensional stacks of memory inside the same package as the processing units can provide orders of magnitude more bandwidth at significantly lower power costs. Recent research has focused on utilizing the stacked dynamic random-access memory (DRAM) as a large, high-bandwidth last-level cache and coping with the challenges of managing the large tag storage required and the relatively slower latencies of DRAM compared to on-chip static random-access memory (SRAM). However, these approaches require complex changes to the processor and cannot leverage the stacked memory to increase the system's overall memory capacity.

SUMMARY

Systems, apparatuses, and methods for sorting memory pages in a multi-level memory hierarchy are contemplated.

In various embodiments, a system may include a multi-level heterogeneous memory hierarchy with at least two different types of memory. In one embodiment, a first memory level utilizing a first type of memory may be a fast, in-package, die-stacked memory and a second memory level utilizing a second type of memory may be off-package commodity memory (e.g., double data rate type three (DDR3) synchronous dynamic random-access memory (SDRAM), double data rate fourth generation (DDR4) SDRAM). In one embodiment, the first memory level inside the same package as the processing units may be exposed as part of the overall system's physical address space. The system software may be configured to identify the set of pages to be brought into the first memory level and then adjust this set dynamically in response to the changing memory behavior of the applications executing on the system. In various embodiments, the hot page set may be dynamically tuned to different application scenarios.

In various embodiments, any of various policies may be utilized to identify the set of pages to be brought into the faster memory regions of a system with a multi-level memory hierarchy. The techniques may dynamically adjust this set of pages in response to changing memory behavior of the applications running on the system. The system software may be configured to compute a score for each page based on a variety of factors (e.g., number of accesses, type of accesses, power consumption per access, wearability), with the assigned score determining the hotness of a page. In some embodiments, the system software may be configured to sort the pages such that the hotter pages are stored in the memory levels closest to the processing units of the system.

In various embodiments, a hotness threshold 'q' may be utilized to express the popularity of a page deemed "hot". In one embodiment, a control unit may dynamically adjust the hotness threshold 'q' to target the ideal set of hot pages. Periodically, the size of the hot set may be compared to the size of the faster memory region 'N'. If the size of the hot set is greater than the size of the faster memory region 'N', then the threshold 'q' may be increased. Otherwise, if the size of the hot set is less than the size of the faster memory region 'N', then the threshold 'q' may be decreased.

In one embodiment, a system with a heterogeneous memory architecture (HMA) may map both the fast memory (e.g., SRAM, stacked DRAM) and the off-package memory (e.g., DDR3, non-volatile random-access memory (NVRAM)) to the same physical address space. In various embodiments, system software (e.g., operating system, device drivers, middleware, etc.) may dynamically adjust the set of pages that is to be brought into the faster levels of memory by continuously modifying the configuration parameters that influence the "hot" set of most valuable pages. By observing the effect those changes make on the hot set, the configuration may be later refined to further approximate the ideal set of pages for the faster memory regions.

In one embodiment, a "hotness" score may be calculated for each page during the current interval and then stored for further processing. After scores have been generated over multiple intervals, a trace analyzer may be configured to perform a time series analysis on the scores of the plurality of pages. The trace analyzer may also analyze the difference between the size of the hot page set and the size of the faster memory region 'N' over multiple intervals. Based on the time series analysis, the trace analyzer may generate a prediction of the hotness value for each page, wherein the predicted hotness value is utilized in a future interval. The system may then sort the pages in future intervals based on these predicted hotness values.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Computer systems sometimes implement main memory using different instances and/or kinds of system memories, such as 3D stacked memory (e.g., stacked DRAM), interposer-based integrated memory, multi-chip modules (MCM), off-chip DRAM on a motherboard, and/or other types of memory. Such system memories may together implement main memory by each implementing a respective subset of the main memory physical address space. The term "system memory" or "main system memory" is used herein to refer to one or more physical memory components of a given type, which are used to implement all or part of a system's main memory address space. The term system memory is therefore distinguished from "cache memory", which does not implement the main memory address space, but rather stores local copies of data stored in a system memory. Because different memories may be implemented with different technologies and/or in different places in the system, access by a given processor to different memories may be performed with different latency, bandwidth, power consumption, and/or other performance characteristics. For example, a processor may be able to access a portion of memory that is integrated onto that processor using stacked DRAM technology with lower latency and/or power consumption than it can a different portion of memory that is located off-chip (e.g., on the motherboard).

Figure 1:
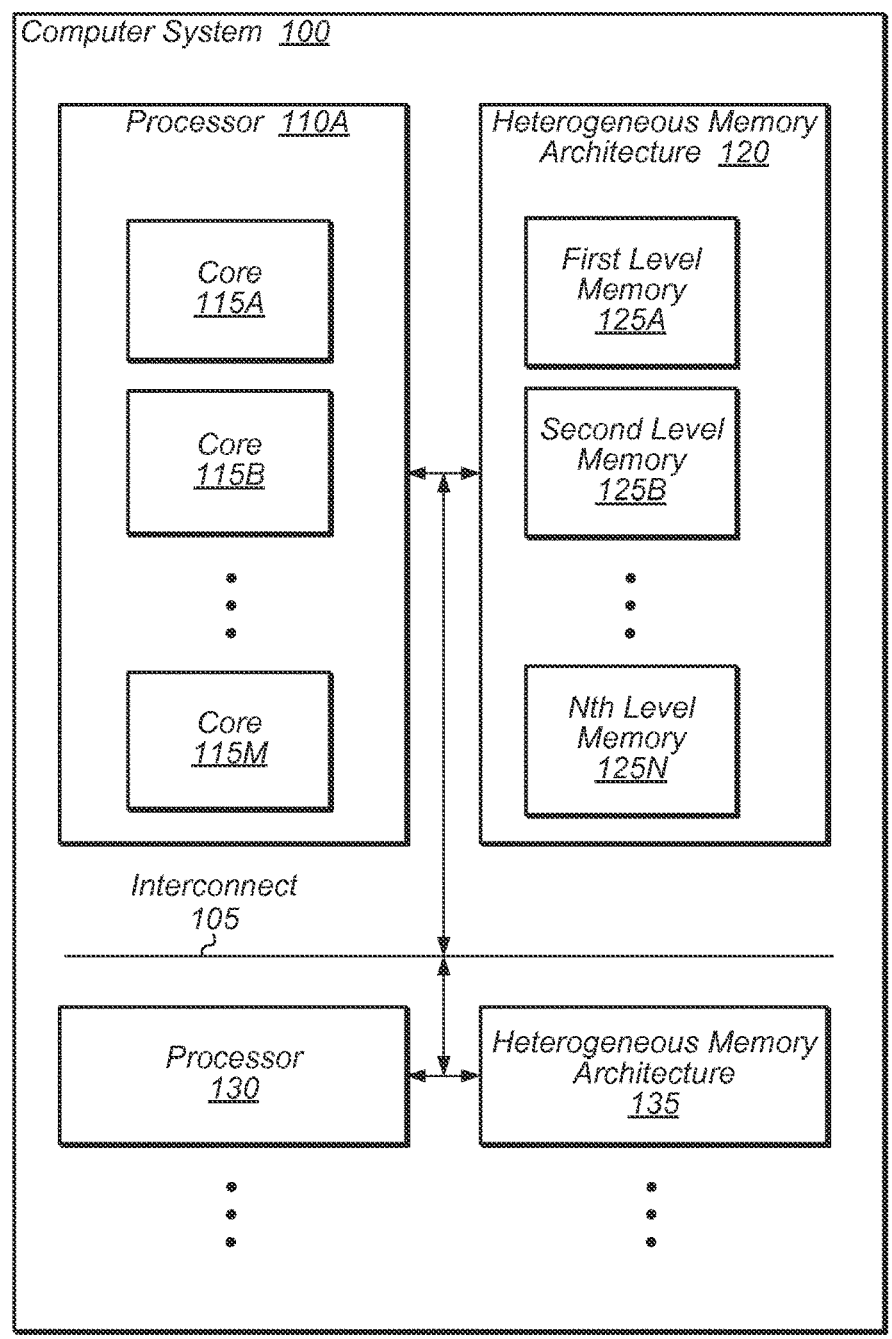
FIG. 1 is a block diagram of one embodiment of a computing system with a heterogeneous memory architecture (HMA).

Referring now to FIG. 1, a block diagram illustrating one embodiment of a computing system 100 with a heterogeneous memory architecture (HMA) 120 is shown. Computing system 100 may include processors 110A and 130, which are representative of any number of processors. Processors 110A and 130 may also be referred to as "nodes" in some embodiments. Processors 110A and 130 may be coupled to HMAs 120 and 135, respectively. Processors 110A and 130 may also be coupled to each other (and to other processors and other components not shown in FIG. 1) via interconnect 105. One or more other memory modules (not shown) may also be coupled to interconnect 105.

Processor 110A includes cores 115A-M, which are representative of any number of cores. Processor 110A may be a CPU, GPU, or other type of processor, depending on the embodiment. Processor 110A is coupled to HMA 120, and HMA 120 may include multiple levels of memory (e.g., first level memory 125A, second level memory 125B, Nth level memory 125N). In some embodiments, the different levels of memory may be implemented using different types of memory technology. For example, in one embodiment, first level memory 125A may be stacked DRAM in the same package as processor 110A and may provide low-latency, high bandwidth memory. In this embodiment, second level memory 125B may be a high-latency, high capacity DDR3 memory, and Nth level memory 125N may be a NVRAM. Other embodiments may include other numbers of levels and/or other types of memory technology (e.g., phase-change memory, spin-transfer torque magnetic random-access memory, memristor). In one embodiment, the lowest levels of memory (i.e., first level memory 125A) which are closest to the compute cores 115A-M of processor 110A may be the fastest levels of memory of HMA 120. However, in other embodiments, the fastest levels of memory may be located further away from the compute cores 115A-M of processor 110A. In one embodiment, the operating system (OS) of processor 110A may be configured to manage all of the levels of HMA 120 as a unified physical address space. This differs from the prior art approach which utilizes hardware caching logic to manage the lowest memory levels closest to the processor as hardware cache(s).

In one embodiment, the management of HMA 120 and HMA 135 may be performed in the software layers of the system 100. The software may identify the set of pages to be brought into the faster memory regions and then the software may adjust this set dynamically in response to the applications' changing memory behavior. In various embodiments, a generalized HMA approach may be utilized for dynamically tuning the hot page set to different application scenarios. In one embodiment, a hotness threshold 'q' may be utilized to express the popularity of a page deemed "hot". Setting the threshold 'q' too low can cause the HMA to have too large of a hot set, thereby increasing the overhead of choosing the top-N pages for a fast memory level of size 'N'. Setting the threshold 'q' too high results in a small hot set, which in turn will cause the fast memory regions to be underutilized. Accordingly, the threshold 'q' can vary from application to application, within phases of an application, and also depending on the actual size of the faster memories in a given system.

In one embodiment, a HMA controller (implemented in software and/or hardware) may dynamically adjust the hotness threshold 'q' to target the ideal set of hot pages. Periodically, the size of the hot set may be compared to the size of the faster memory region (N), which in one embodiment may be the size of first memory level 125A. If the hot set is too small to fill the fast memory, then 'q' may be lowered, causing more pages to be classified as hot. Likewise, if the hot set is too large, 'q' may be increased, causing fewer pages to be put in the hot set. Through the use of any of a variety of feedback mechanisms, the size of the hot set should converge to 'N'. In one embodiment, it may be desirable to have the hot set size equal (or come very close) to 'N'. In the case that the size of the hot set equals 'N', then the under-utilization of the faster memory regions will be minimal, and there will be no need to sort the pages to find the top-N. Depending on the embodiment, there are a variety of ways to update 'q' each interval. In one embodiment, a proportional linear feedback system may be utilized. In other embodiments, other algorithms may be utilized.

In various embodiments, the operating system (OS) executing on processor 110A may be configured to generate values for each page of the plurality of pages utilized by the applications executing on processor 110A. The values may be generated based on one or more factors (e.g., number of accesses, type of accesses, energy consumption per access, wearability) associated with each page. The OS may then sort the pages into levels of HMA 120 based on the generated values. For example, in one embodiment, the OS may utilize a plurality of programmable thresholds to determine where to store the pages. In this embodiment, if a given page has a value greater than a first programmable threshold, then the given page may be stored in first level memory 125A. If the given page has a value less than the first programmable threshold but greater than a second programmable threshold, then the given page may be stored in second level memory 125B. This scheme may continue for any number of levels of HMA 120. Finally, if the given page has a value less than an Nth programmable threshold, then the given page may be stored in Nth level memory 125N. In other embodiments, the OS may utilize any of a variety of other policies for determining how to sort the pages into the different levels of HMA 120. These policies will be described in more detail in the remainder of this disclosure.

Figure 2:
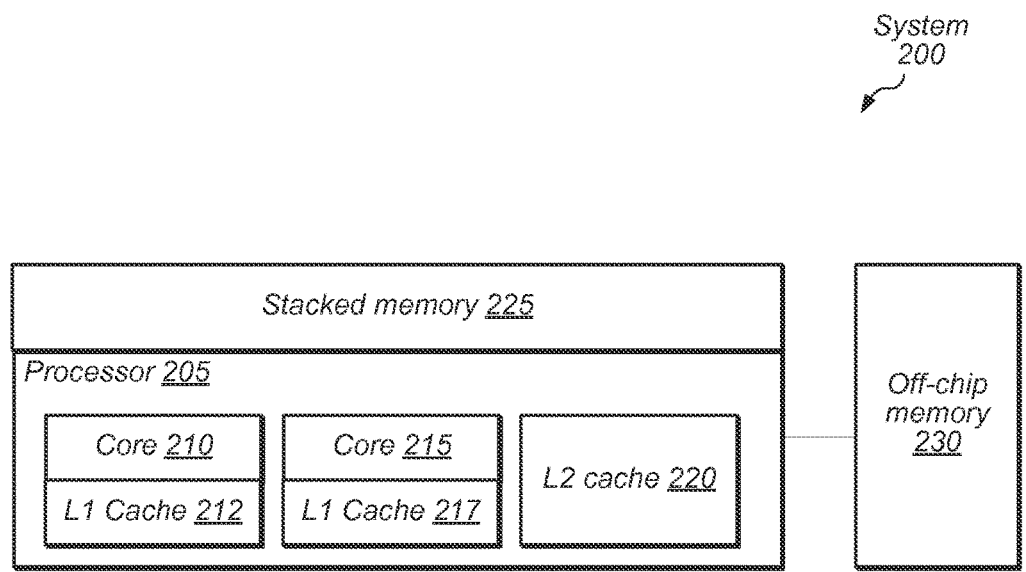
FIG. 2 is a block diagram of one embodiment of a computer system that implements main memory using different memory technologies.

Turning now to FIG. 2, a block diagram illustrating one embodiment of a computer system 200 that implements main memory using different memory technologies is shown. The illustrated system 200 is intended to provide one example of a system that implements caching and different main memories. However, in various embodiments, the caching techniques described herein may be applied to multi-memory systems with different and/or additional memories and cache structures.

As shown in FIG. 2, system 200 includes a multi-core processor 205 that has access to two kinds of main system memory: off-chip memory 230 and stacked memory 225. Off-chip memory 230 may be separate from processor 205. For example, off-chip memory 230 may be implemented as one or more DRAM chips on a motherboard that also hosts processor 205. Thus, processor 205 may access data in memory 230 via a motherboard-provided interconnect. In contrast to off-chip memory 230, stacked memory 225 may be stacked directly on processor 205. For example, stacked memory 225 may be constructed using multiple layers of active silicon bonded with dense, low-latency, high-bandwidth vertical interconnects. Compared to off-chip DRAM, such as 230, stacked memory 225 may significantly reduce wire delays between the processor and memory, thereby offering increased data bandwidth, decreased latency, and/or lower energy requirements. In some embodiments, stacked memory 225 may also include different memory technologies, such as DRAM, SRAM, high-speed CMOS, high-density DRAM, eDRAM, and/or others. In some cases, stacked memory 225 may be a relatively low capacity memory while off-chip memory 230 may be a relatively high capacity memory. In the illustrated embodiment, processor 205 includes two cores 210 and 215. Each core has access to a respective L1 data cache (i.e., core 210 to L1 cache 212 and core 215 to L1 cache 217) and the two cores share access to L2 data cache 220.

In one embodiment, rather than using hardware caching techniques to make use of the faster levels of memory (e.g., stacked memory 225), the faster levels of memory may be exposed as part of the system's physical address space. This simplifies the hardware implementation and increases the physical memory capacity of the system. The physical address space may then be broken down into multiple memory pages and managed by the operating system (OS). In various embodiments, the OS may determine which pages are retained in stacked memory 225 and which pages are retained in off-chip memory 230. It should be understood that the term "page" is intended to represent any size of memory region. It is also noted that off-chip memory 230 may also be referred to as off-package memory 230.

Throughout the remainder of this disclosure, several techniques for efficiently detecting those memory pages that are deemed more valuable (or "hot") than the rest of the pages in the physical address space will be presented. The techniques differ by their precision, incurred overhead, and method of hotness estimation. In one embodiment, once the hot pages are selected, they may be moved into faster memory regions by the OS through the mechanism of system calls that change a page's physical location without changing the virtual address of the pages. Examples of such system calls for a non-uniform memory access (NUMA) system include numa_move_pages and numa_migrate_pages.

Different service providers may want to select "hot" pages based on different value estimations. While the page may be judged upon the popularity of its data, the calculation of such popularity can differ. In one embodiment, the pages may be rated purely based on the number of accesses to their content. That, however, may not work best for a system with varying page sizes (e.g., a system where both regular 4K pages as well as large pages (64K or 4 MB) are present). In the latter case, a number of accesses per byte may be more appropriate.

Tracking the number of accesses to each page may be a good estimator if the goal is to reduce the number of accesses to slower memory regions. If, on the other hand, the goal is to reduce power consumption, or to maximize performance per watt, the accesses may be weighed differently based on their energy cost (e.g., the reads that request more data can be more energy efficient with respect to the reads that request only one byte in a single bus command). For non-volatile memories (NVMs), the pages may be rated in inverse proportion to the number of writes to them, as the goal may be to reduce NVM wear-out. In other words, for a NVM, as the number of writes to a page increases, the value of the page decreases.

The system may track the number of accesses of a particular type to a page in a variety of ways. In one embodiment, a "First Touch" allocation policy may place a page of memory on one of the memory channels belonging to the same socket of the thread that first requested the page (if there is room). For private, per-thread data, this ensures that such pages are co-located with the only thread that will ever use them. For shared pages, the heuristic also works well in many scenarios. For an HMA system, at the start of each interval, all pages are initially marked invalid in the page tables (and all translation lookaside buffers (TLBs) must be shot down). Then, as pages are accessed, there are two scenarios. In the first case, the page is currently in the off-package memory 230, and so the page is migrated to the fast memory (i.e., stacked memory 225), the page table is updated to reflect the new mapping, and the page table entry (PTE) valid bit is set. In the second case, the page is already in the fast memory (i.e., it was mapped there during the previous interval), and so only the PTE's valid bit needs to be set. Any subsequent accesses to this page will proceed normally (i.e., without a page fault) as the corresponding PTE is now valid. As new pages are accessed for the first time during the interval, more pages are migrated into (or re-enabled) in the fast memory until the fast memory is completely filled up. Note that as pages are migrated in, pages from the fast memory may also need to be migrated out. Note that any such pages still have invalid PTEs, and so the OS is free to change their mappings without worrying about TLB consistency issues (i.e., no need for shootdowns). Eventually after the fast memory has been filled, the OS re-enables the valid bits on all remaining pages that will now be stuck in the slower off-package memory 230 for the rest of the interval. This first-touch HMA policy may not require any additional hardware support to track page access counts, but it may select a sub-optimal set of pages to place in the fast memory as the first pages touched in an interval are not necessarily the ones that are responsible for the most memory traffic. Another challenge for first-touch is that each "first touch" event during an interval incurs a page fault that includes an OS interrupt. This is different from a history-based approach (described in more detail below) which takes longer to sort and migrate a large number of pages at the start of an interval, but then does not interfere until the next interval.

A history-based approach (or history policy) may select pages based on past traffic patterns. A program's execution may be divided into intervals, where each interval is a fixed-length interval (e.g., 0.1 seconds). During the course of each interval, the memory traffic (i.e., from last-level cache misses) associated with each page may be tracked. At the end of an interval, the OS may sort all of the pages, and for a fast memory with a capacity of N pages, the OS may select the top-N pages responsible for the greatest amount of main memory traffic to be placed into fast memory. Any pages that were in the fast memory but did not make the top-N cut for the next interval may be migrated back out to off-package memory 230, and the page table may be updated to reflect all new page placements. Depending on the embodiment, different mechanisms may be utilized by the hardware to maintain per-page traffic counts. In one embodiment, the accesses can be collected on-the-fly with the assistance of a hardware feature called Instruction Based Sampling (IBS) (Precise Event Based Sampling on Intel machines). Through counters like MSRC001_1031 IBS Fetch Linear Address (IC_IBS_LIN_AD) or MSRC001_1032 IBS Fetch Physical Address (IC_IBS_PHYS_AD), the OS or workload can collect memory access trace of a particular process. To do so, the software has to choose an IBS sampling rate of profiling (higher rate means the accesses of more individual instructions captured, but also higher system overhead) and then collect a certain portion of accesses. This history-based page selection relies on the assumption that a page that was heavily used in the recent past will continue to be heavily used (and similarly, cold pages remain cold). The selection of a shorter interval length allows the history policy to adapt more quickly to changes in a program's working set, but then it also increases the inter-interval OS overhead.

The history-based policy described above may incur high system overhead because it typically involves sorting every page in memory based on access counts and then selecting the top N pages (where N is the size of the fast memory). In another embodiment, a coarse hot page policy may be utilized which simplifies the problem by simply dividing pages into two coarse categories: "hot" versus "cold" pages using a simple threshold. Any page that has an access count that exceeds a fixed threshold 'q' may be classified as hot (for the current interval). By choosing 'q' correctly, the number of pages classified as hot will be relatively close to N. In the ideal case, if the hot-page count is exactly N, the sorting operation can be completely skipped because choosing the top-N out of a set of N simply amounts to choosing the entire set. Sorting is also unnecessary when the size of the hot set is less than N. Under normal operation, the hot set will usually be different than N. In the case where there are more hot pages than fit in the fast memory, the OS can choose the top-N. In the case where the set of hot pages fail to use up all of the fast memory, the remaining capacity may be filled using a first-touch approach or any other approach. A key advantage to the coarse hot page policy approach is that, similar to the history-based policy, pre-loading pages and making the corresponding PTEs valid at the start of the interval cuts down on faults related to migrating pages via the first-touch mechanism. This first-touch hot-page (FTHP) policy is effectively a generalization of both the history-based and first-touch algorithms. When the threshold 'q' is set to zero, then all pages are considered hot, and so sorting the hot pages is the same as sorting all of memory, which then is equivalent to the history-based policy. When 'q' is set to some relatively large non-zero value, then no pages are ever in the hot set, so the entirety of the fast memory is populated via the first-touch mechanism. Setting 'q' to finite, non-zero values strikes a balance between the two approaches: some number of hot pages are pre-loaded into the first-level memory to reduce faults, and the remaining first-level memory capacity can be populated dynamically based on whichever pages the program accesses.

The FTHP policy typically involves tracking the per-page memory traffic. In some embodiments, an extension may be added to the existing TLBs and hardware page table walker (PTW) logic, along with some potential changes at the software level. In one embodiment, each PTE may be logically extended with a count field that records the number of memory accesses for that page. Each TLB entry may also be extended with a field to track the number of accesses to the page corresponding to the cached PTE. On each lower-level cache miss, the counter may be incremented. On a TLB eviction, the counter value may be written back and added to in-memory count. The OS can then use these access count values in choosing its hot pages. For some architectures, the PTEs may not have enough free bits to store an access count. In these cases, the counts may be stored in an auxiliary data structure that parallels the page table. In other architectures with enough free bits in the PTEs (or in a system where large pages are used, which frees up several PTE bits), the counters may be directly placed in the PTEs. The hardware PTW may also be modified to perform this read-modify-write on the counters. For example, in one embodiment, the primary additional hardware for the PTW may be a single adder and the relevant control logic/finite-state-machine updates.

In another embodiment, an HMA policy that requires minimal hardware changes may be utilized. The hardware and software support for tracking the hottest pages for the policies described above may be too invasive for mainstream systems (e.g., those based on the x86 ISA). In some embodiments, an approximation may be utilized which greatly simplifies the hardware support. Accordingly, rather than indicating whether a particular memory page has been read or written by the system/processor at least once (which is the case for traditional "referenced" bits in the OS page table entries), the Hot Bit marks those pages that were accessed at least q times, where q is a configurable kernel parameter. At the end of the interval, all pages that had more than q memory accesses will have their respective accessed/hot bits set in the PTE. These now may form the hot set of pages. Similar to FTHP, if the hot set is smaller than N, then a first-touch policy may be utilized to populate the remainder of the fast memory. If the hot set is larger than N, then the fast memory may be populated by the first N pages. The first N pages can be chosen based on a first-come, first-served (FCFS)/first-in, first-out (FIFO) order or, if the pages are stored in a hot set indexed by the physical address, the pages with the smallest or largest physical addresses.

Figure 3:
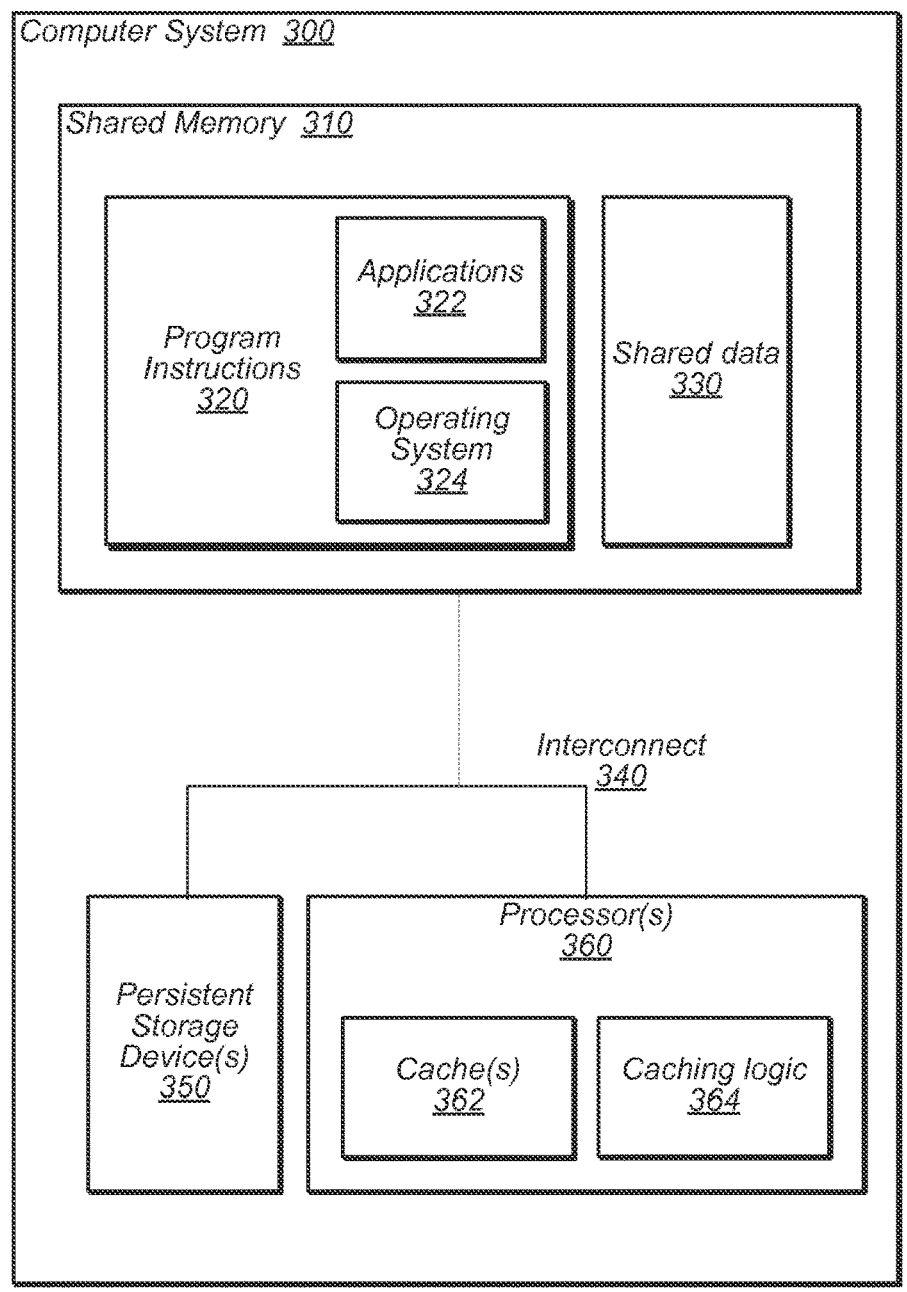
FIG. 3 illustrates a computer system in accordance with one embodiment.

Referring now to FIG. 3, a block diagram illustrating a computer system 300 in accordance with one embodiment is shown. The computer system 300 may correspond to any of various types of devices, including, but not limited to, a personal computer system, desktop computer, laptop or notebook computer, tablet, phone, smartphone, mainframe computer system, handheld computer, workstation, network computer, a consumer device, application server, storage device, a peripheral device such as a switch, modem, router, etc, or in general any type of computing device.

Computer system 300 may include one or more processors 360, any of which may include multiple physical and/or logical cores. Any of processors 360 may correspond to processor 205 of FIG. 2 and may include data caches, such as caches 362. Caches 362 may include multiple caches at different levels of a cache hierarchy. For example, caches 362 may correspond to L1 caches 212 and 217, L2 cache 220, and/or to other caches. Caches 362 may also include caching logic 364. Computer system 300 may also include one or more persistent storage devices 350 (e.g., optical storage, magnetic storage, hard drive, tape drive, solid state memory) which may persistently store data.

According to the illustrated embodiment, computer system 300 includes one or more shared memories 310 (e.g., one or more of cache, SRAM, DRAM, stacked memory, RDRAM, EDO RAM, DDR RAM, SDRAM, Rambus RAM, EEPROM) which may be shared between multiple processing cores, such as on one or more of processors 360. In some embodiments, different ones of processors 360 may be configured to access shared memory 310 with different latencies. In some embodiments, shared memory 310 may include multiple different types of memories, various ones of which may be capable of accessing memory at different speeds.

The one or more processors 360, the storage device(s) 350, and shared memory 310 may be coupled via interconnect 340. In various embodiments, the system may include fewer or additional components not illustrated in FIG. 3 (e.g., video cards, audio cards, additional network interfaces, peripheral devices, a network interface such as an ATM interface, an Ethernet interface, a Frame Relay interface, monitors, keyboards, speakers). Additionally, different components illustrated in FIG. 3 may be combined or separated further into additional components.

In some embodiments, shared memory 310 may store program instructions 320, which may be encoded in platform native binary, any interpreted language such as Java™ byte-code, or in any other language such as C/C++, Java™, etc. or in any combination thereof. Program instructions 320 may include program instructions to implement one or more applications 322, any of which may be multi-threaded. In some embodiments, program instructions 320 may also include instructions executable to implement an operating system 324, which may provide software support to applications 322, such as scheduling, software signal handling, "hot" page value calculating, page sorting, etc.

According to the illustrated embodiment, shared memory 310 includes shared data 330, which may be accessed by one or more of processors 360 and/or various processing cores thereof at different latencies and/or bandwidths. Ones of processors 360 may cache various components of shared data 330 in local caches (e.g., 362) and coordinate the data in these caches by exchanging messages according to a cache coherence protocol. In some embodiments, multiple ones of processors 360 and/or multiple processing cores of processors 360 may share access to caches 362 and/or off-chip caches.

Program instructions 320, such as those used to implement applications 322 and/or operating system 324, may be stored on a non-transitory computer-readable storage medium. A non-transitory computer-readable storage medium may include any mechanism for storing information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions.

A non-transitory computer-readable storage medium as described above may be used in some embodiments to store instructions read by a program and used, directly or indirectly, to fabricate hardware comprising one or more of processors 360. For example, the instructions may describe one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 300. The netlist may then be placed and routed to produce a data set describing geometric shapes to be applied to masks. The masks may then be used in various semiconductor fabrication steps to produce a semiconductor circuit or circuits corresponding to processors 360. Alternatively, the database may be the netlist (with or without the synthesis library) or the data set, as desired.

Figure 4:
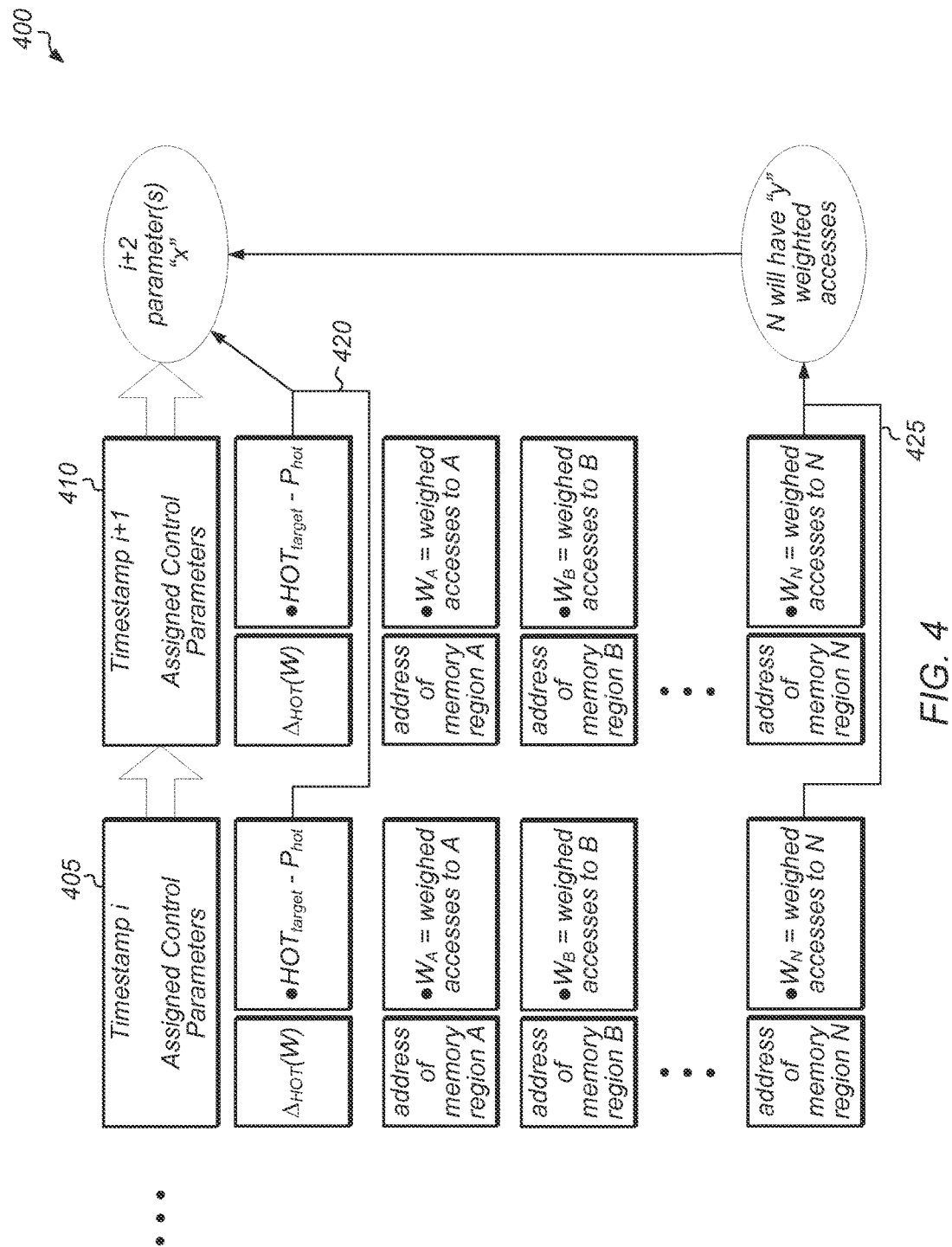
FIG. 4 is a block diagram of one embodiment of performing a time series analysis for dynamically adjusting the hot set.

Turning now to FIG. 4, a block diagram of one embodiment of performing a time series analysis 400 for dynamically adjusting the hot set is shown. In one embodiment, a controller may be configured to perform generalized hot set adjustment to continuously observe the hot set of pages the system brings into the faster levels of memory and then refine one or more control parameters in an attempt to influence the future hot set. The controller may be implemented using any combination of software and/or hardware, depending on the embodiment. Each memory region A, B, and N is intended to represent a memory region which is being monitored by the controller. In one embodiment, the size of each memory region may be a page, while in other embodiments, other sizes of memory regions may be utilized. The time series analysis 400 may be performed over any number of prior intervals, depending on the embodiment. Two intervals 405 and 410, with timestamps 'i' and 'i+1', are shown in FIG. 4 to represent any number of intervals over which the time series analysis 400 may be performed.

In one embodiment, the controller may dynamically decide on the next value for the control parameter(s) 'x' in interval 'i+2' by taking advantage of the time series analysis 400 performed by one or more trace analyzers. In one embodiment, the control parameter 'x' may be the hotness threshold, while in other embodiments, other control parameters may be used, including any parameters that control a set of pages to be brought/evicted from the faster memory regions of the multi-level memory hierarchy. The analysis can work off of traces that store weighed access patterns of an application in the form of a single linked list. The linked list may be utilized to facilitate gradual addition of new records as the process moves from one time interval to the next. Each entry of the list may contain the timestamp of the corresponding interval, the control parameter(s) that were assigned by the controller within this interval, the divergence of the application's hot set from the target set ($\Delta_{HOT}$), and a pointer to a hash table that stores the information about those pages that were accessed within this period. The hash table may facilitate random access to the data during the subsequent analysis of the data and deduction of the future access patterns. In one embodiment, the trace may be stored in the kernel memory space.

In one embodiment, the traces may be inspected by one or more trace analyzers that make predictions of how many accesses to a particular memory region will be performed next and what the next resource assignment should be. The time series of the number of accesses $W_A$, $W_B$, etc. within the respective interval from each memory region are first analyzed, independently from other regions, which is depicted by arrow 425 for region N in FIG. 4. Additionally, the difference between the target number of hot pages ($HOT_{target}$) and the actual number of hot pages within a given interval ($P_{hot}$) may be analyzed over multiple intervals, as indicated by arrow 420. In one embodiment, the number of hot pages within a given interval $P_{hot}$ is the function of the assigned control parameter(s) and the number of accesses to each memory region A-N. Since the $HOT_{target}$ is known upfront and W is predicted by the trace analyzers, the controller can derive the required value of the future parameter(s) 'x' for $P_{hot}$ to be close to $HOT_{target}$ (e.g., through extrapolation).

In various embodiments, many different analyzers may be utilized to extrapolate the function of interest on both stages of prediction. In some embodiments, multiple analyzers may process the trace concurrently. Some of the analyzers may utilize simple techniques, for example, characterizing the trace with linear regression, a Markov model, etc. Additionally, more sophisticated methods can be implemented, which may be based on statistical prediction techniques that include general regression analysis and time series analysis (e.g., ordinary least squares, multinomial logistic regression, autoregressive moving average models). Once the recurring period is processed by all of the analyzers, the prediction of the analyzer with the highest confidence may be used in assigning the control parameter(s) 'x'. In one embodiment, the hotness threshold 'q' may be the control parameter which is monitored and set by the controller. The hotness threshold 'q' may be the parameter which determines the popularity of page deemed "hot". However, it should be understood that one or more other control parameter(s) may also be monitored by the controller in other embodiments.

Figure 5:
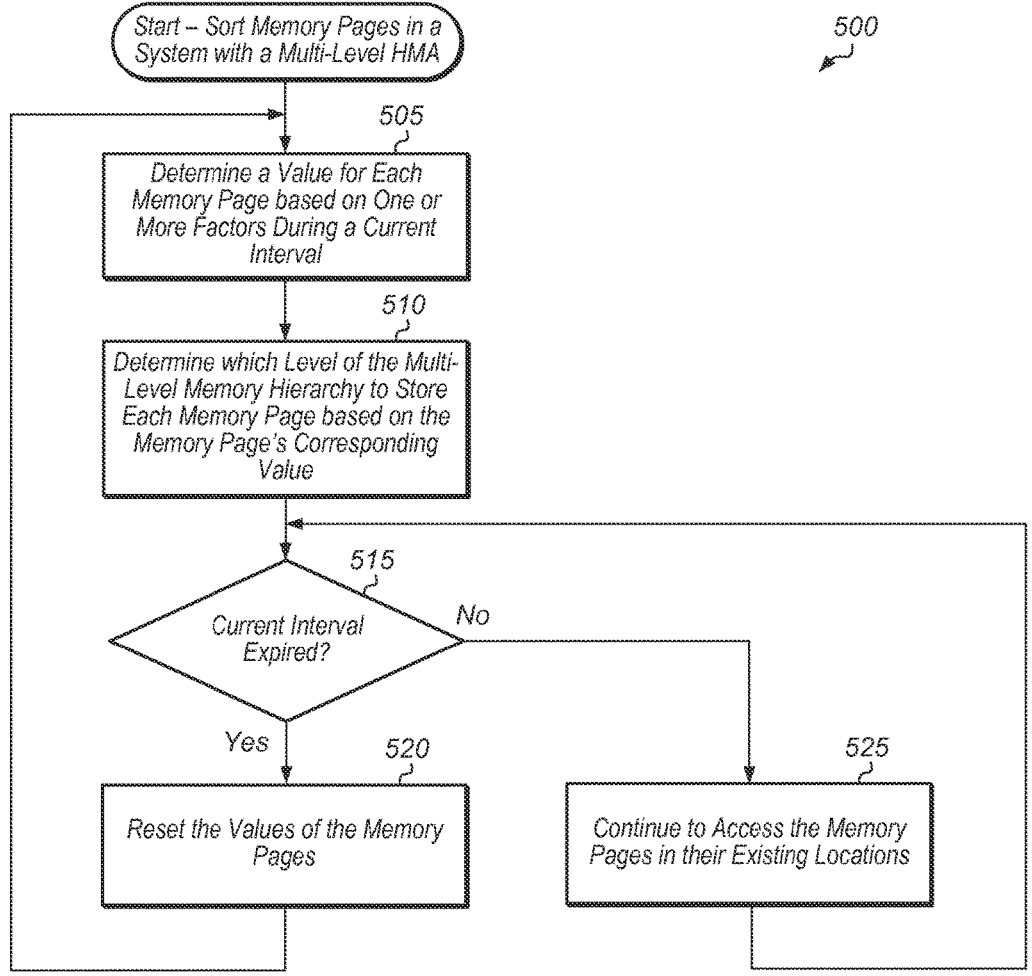
FIG. 5 is a generalized flow diagram illustrating one embodiment of a method for sorting memory pages in a system with a multi-level heterogeneous memory architecture (HMA).

Referring now to FIG. 5, one embodiment of a method 500 for sorting memory pages in a system with a multi-level heterogeneous memory architecture (HMA) is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 500.

A controller on a system with a multi-level heterogeneous memory architecture may determine a value for each memory page of a plurality of memory pages based on one or more factors during a current interval (block 505). In various embodiments, the controller may be system software executing on one or more processing units of the system. Depending on the embodiment, the system software may include the operating system (OS), kernel, device driver, middleware, and/or other software. In other embodiments, the controller may be implemented using any combination of software and/or hardware.

In some embodiments, the value for a given page may be calculated using a weighted sum of multiple factors, wherein the factors include a number and type of accesses to the page in a given interval, an amount of energy consumed accessing the page in the given interval, wearability of the memory level, temperature, etc. For example, for a non-volatile memory device with a limited number of write cycles, the controller may attempt to put pages in the non-volatile memory device which have the fewest number of write accesses to prevent the non-volatile memory device from wearing out. In another embodiment, the value for a given page may be a single bit, and the value may be set to a '1' if the number of accesses to the page is greater than a programmable threshold and the value may be set to a '0' if the number of accesses to the page is less than the programmable threshold. In a further embodiment, the way the value is calculated by the controller may change over time as system conditions change. Additionally, in some embodiments, the value may be calculated over multiple intervals rather than just the most recent interval.

Next, the controller may determine which level of the multi-level memory hierarchy to store each memory page of the plurality of memory pages based on the corresponding value of the memory page (block 510). In one embodiment, the more valuable memory pages may be placed closer to the compute cores of the system. In some embodiments, the memory level(s) closest to the compute cores may be the fastest, lowest capacity memory levels while the memory level(s) furthest from the compute cores may be the slowest, highest capacity memory levels. In other embodiments, these designations may be reversed.

Next, the controller may determine if the current interval has expired (conditional block 515). If the current interval has expired (conditional block 515, "yes" leg), then the controller may reset the values of the memory pages (block 520). In various embodiments, before resetting the values, the current values may be stored (e.g., archived) for future analysis (e.g., as shown in FIG. 4). After block 520, method 500 may return to block 505. If the current interval has not expired (conditional block 515, "no" leg), then the system may continue to access the memory pages in their existing locations (block 525). After block 525, method 500 may return to conditional block 515.

Figure 6:
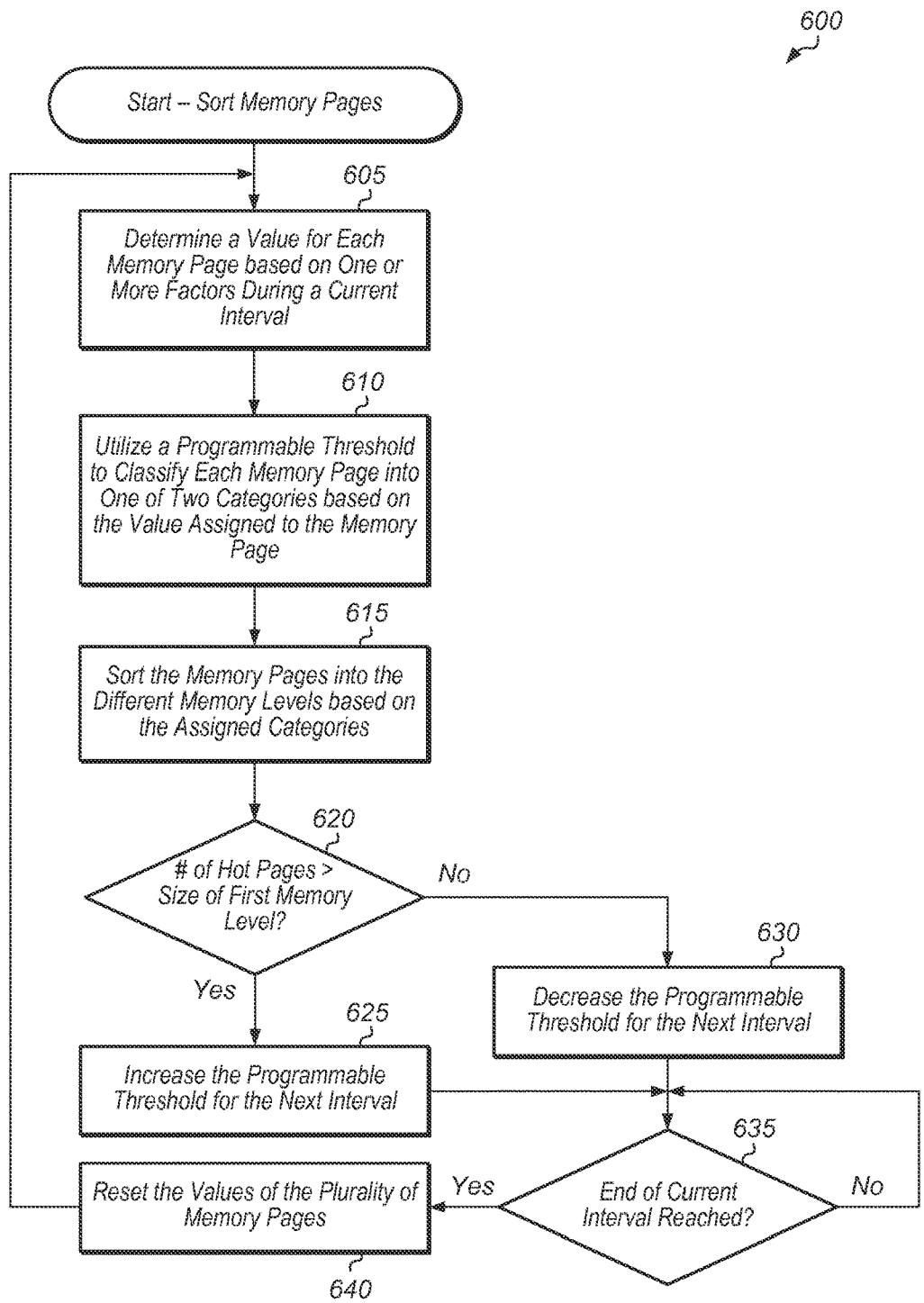
FIG. 6 is a generalized flow diagram illustrating another embodiment of a method for sorting memory pages in a system with a multi-level heterogeneous memory architecture (HMA).

Turning now to FIG. 6, another embodiment of a method 600 for sorting memory pages in a system with a multi-level heterogeneous memory architecture (HMA) is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 600.

A controller on a system with a multi-level heterogeneous memory architecture may determine a value for each memory page of a plurality of memory pages based on one or more factors during a current interval (block 605). Depending on the embodiment, the controller may be implemented using any combination of software and/or hardware. The one or more factors may include at least a number and type of accesses to the page in a given interval, an amount of energy consumed accessing the page in the given interval, wearability of the memory level, temperature, etc. Next, the controller may utilize a programmable threshold to classify each memory page into one of two categories based on the value assigned to the memory page (block 610). For example, in one embodiment, if the memory page has a number of accesses in a given interval greater than the programmable threshold, then the memory page may be classified as a "hot" memory page. If the memory page has a number of accesses in the given interval less than the programmable threshold, then the memory page may be classified as a "cold" memory page. In other embodiments, other techniques for classifying memory pages may be utilized. For example, in another embodiment, the value of a memory page may be calculated as a weighted sum of a plurality of values. Additionally, in a further embodiment, the controller may utilize a plurality of thresholds to classify memory pages into a plurality of categories. For example, in one embodiment, the system may include four separate memory levels, and the controller may utilize three thresholds to classify each page into one of four categories, with each category corresponding to a respective memory level.

Next, the controller may sort pages into the different memory levels based on the assigned categories (block 615). For example, in one embodiment, "hot" memory pages may be stored in a first memory level closest to the processing units, and "cold" memory pages may be stored in one or more memory levels located further away from the processing units (i.e., higher in the memory hierarchy). Next, the controller may determine if the number of hot pages in the current interval is greater than the size of the first memory level (conditional block 620). If the number of hot pages in the current interval is greater than the size of the first memory level (conditional block 620, "yes" leg), then the controller may increase the programmable threshold for the next interval (block 625). If the number of hot pages in the current interval is less than the size of the first memory level (conditional block 620, "no" leg), then the controller may decrease the programmable threshold for the next interval (block 630). Alternatively, if the number of hot pages is only slightly greater than the size of the first memory level or only slightly less than the size of the first memory level, the controller may elect to maintain the same value for the programmable threshold in the next interval. In other words, if the number of hot pages falls within a given range of the size of the first memory level, the value of the programmable threshold may remain unchanged in the next interval.

After blocks 625 and 630, the controller may determine if the current interval has expired (conditional block 635). If the current interval has expired (conditional block 635, "yes" leg), then the controller may reset the values for the plurality of memory pages (block 640) and then method 600 may return to block 605. In various embodiments, before resetting the values, the current values may be stored (e.g., archived) for future analysis (e.g., as shown in FIG. 4). If the current interval has not expired (conditional block 635, "no" leg), then method 600 may remain at conditional block 635.

Figure 7:
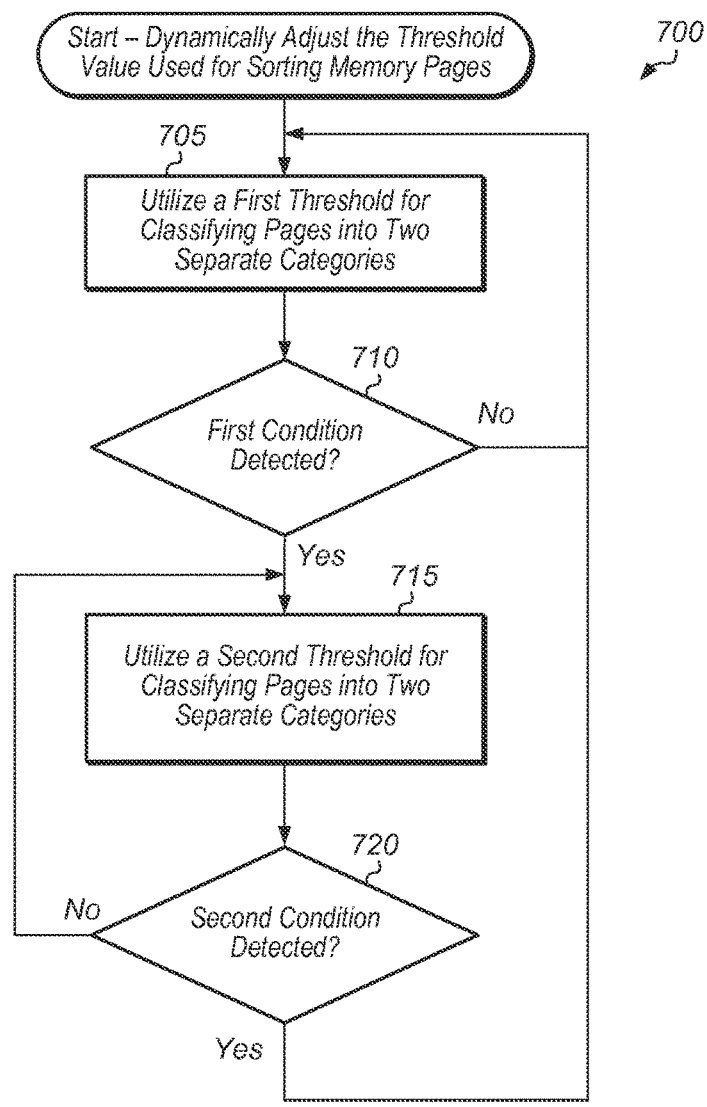
FIG. 7 is a generalized flow diagram illustrating one embodiment of a method for dynamically adjusting the threshold value used for sorting memory pages.

Referring now to FIG. 7, one embodiment of a method 700 for dynamically adjusting the threshold value used for sorting memory pages is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 700.

A controller on a system with a multi-level heterogeneous memory architecture may utilize a first threshold for classifying pages into two separate categories (block 705). In one embodiment, the first category may be for more valuable or "hot" pages and the second category may be for less valuable or "cold" pages. The value of each page may be generated using any of the techniques described in this disclosure. In one embodiment, the controller may prioritize storing more valuable pages in the memory levels closest to the system's processing units while storing less valuable pages in the memory levels furthest away from the system's processing units. In other embodiments, the controller may manage page allocation using other techniques.

Next, the controller may determine if a first condition has been detected (conditional block 710). In one embodiment, the first condition may be detecting that the number of more valuable memory pages is greater than the size of the lowest memory level of the multi-level heterogeneous memory architecture. In other embodiments, the first condition may include other types of conditions, including a change in performance, a change in temperature, a change in operating mode, battery life reaching a threshold, etc. If the first condition has been detected (conditional block 710, "yes" leg), then the controller may utilize a second threshold to classify pages into two separate categories based on the values assigned to the memory pages, wherein the second threshold is different from the first threshold (block 715). For example, in one embodiment, if the first condition is detecting that the number of "hot" memory pages is greater than the size of the lowest memory level, then controller may utilize a higher threshold to classify pages as "hot" or "cold" to reduce the number of hot pages. In this embodiment, the second threshold would be greater than the first threshold. In other embodiments, the second threshold may be less than the first threshold. If the first condition has not been detected (conditional block 710, "no" leg), then method 700 may return to block 705.

After block 715, the controller may determine if a second condition has been detected (conditional block 720). In one embodiment, the second condition may be detecting that the number of more valuable memory pages is less than the size of the lowest memory level of the multi-level heterogeneous memory architecture. In other embodiments, the second condition may include other types of conditions, including a change in performance, a change in temperature, a change in operating mode, battery life reaching a given threshold, etc. If the second condition has been detected (conditional block 720, "yes" leg), then method 700 may return to block 705. If the second condition has not been detected (conditional block 720, "no" leg), then method 700 may return to block 715. It should be understood that method 700 is intended to be a generalized description of a technique for adjusting the threshold based on changing operating conditions. In other embodiments, more than two different threshold values may be utilized and/or the controller may be configured to detect more than two different conditions.

Figure 8:
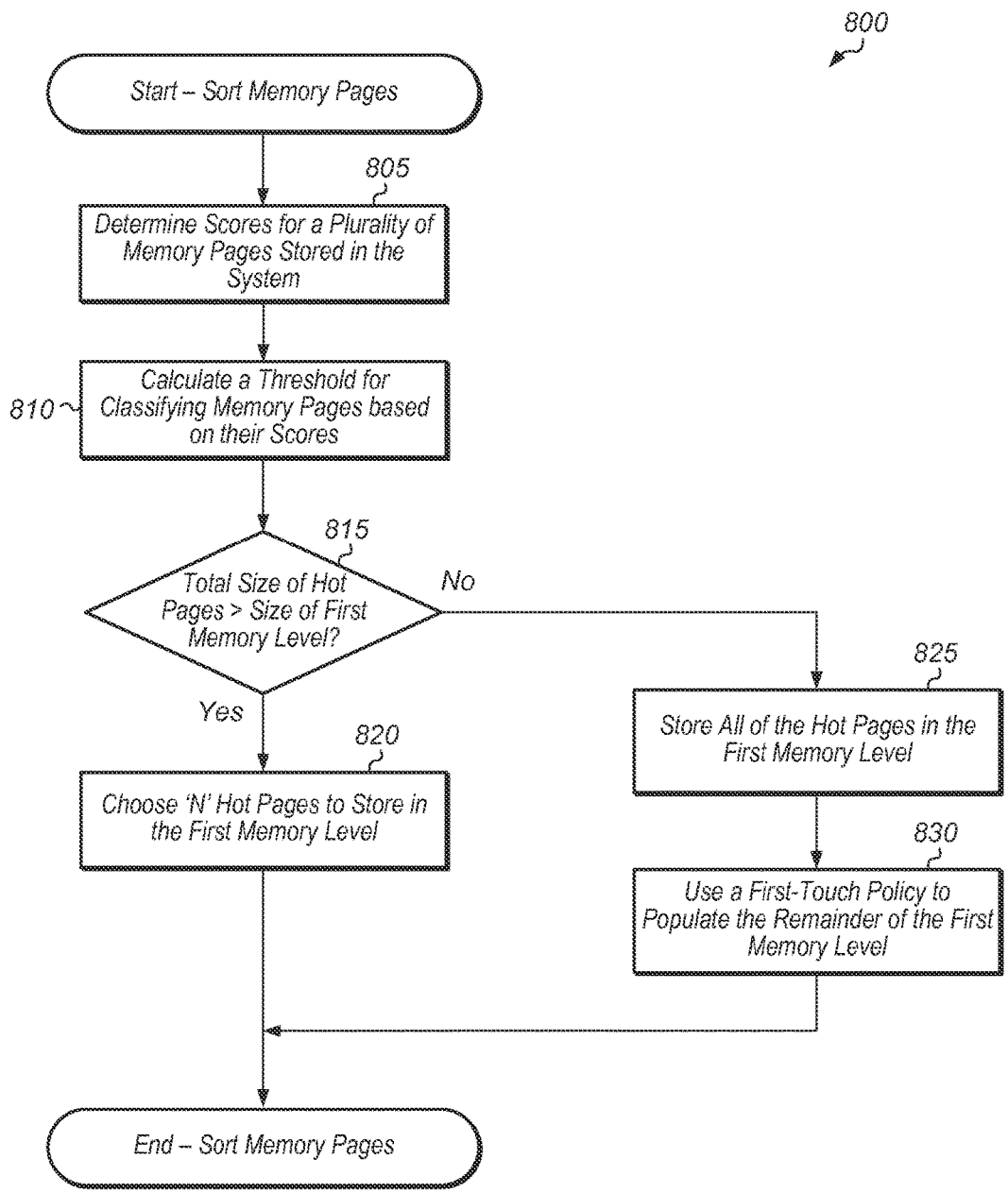
FIG. 8 is a generalized flow diagram illustrating another embodiment of a method for sorting memory pages in a system with a multi-level heterogeneous memory architecture.

Turning now to FIG. 8, another embodiment of a method 800 for sorting memory pages in a system with a multi-level heterogeneous memory architecture is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 800.

A controller executing on a system with a multi-level memory hierarchy may determine scores for a plurality of memory pages stored in the system (block 805). Depending on the embodiment, the score may be calculated based on a single factor, multiple factors, over a single interval, or over multiple intervals. Next, the controller may calculate a threshold for classifying the memory pages based on their scores into one of two categories: hot or cold (block 810). In one embodiment, the controller may calculate the threshold so that the number of hot pages is approximately equal to the size of the closest memory level (i.e., first memory level) to the processor cores of the system.

Next, the controller may determine if the total size of the hot pages is greater than the size of the first memory level (conditional block 815). It may be assumed for the purposes of this discussion that the number of pages that will fit in the first memory level is equal to 'N', wherein 'N' is a positive integer. However, in some embodiments, there may be multiple sizes of memory pages. In these embodiments, 'N' may refer to the total size of the first memory level, wherein 'N' is represented in megabytes (MB), gigabytes (GB), or other similar representation. If the number of hot pages is greater than 'N' (conditional block 815, "yes" leg), then the controller may choose 'N' hot pages to store in the first memory level (block 820). The controller may use any of various techniques for determining which 'N' hot pages to store in the first memory level, depending on the embodiment. If the number of hot pages is less than 'N' (conditional block 815, "no" leg), then the controller may store all of the hot pages in the first memory level (block 825). Then, the controller may use a first-touch policy to populate the remainder of the first memory level (block 830). Alternatively, in other embodiments, the controller may use any of the various other previously-described policies for populating the remainder of the first memory level. After blocks 820 and 830, method 800 may end.

Figure 9:
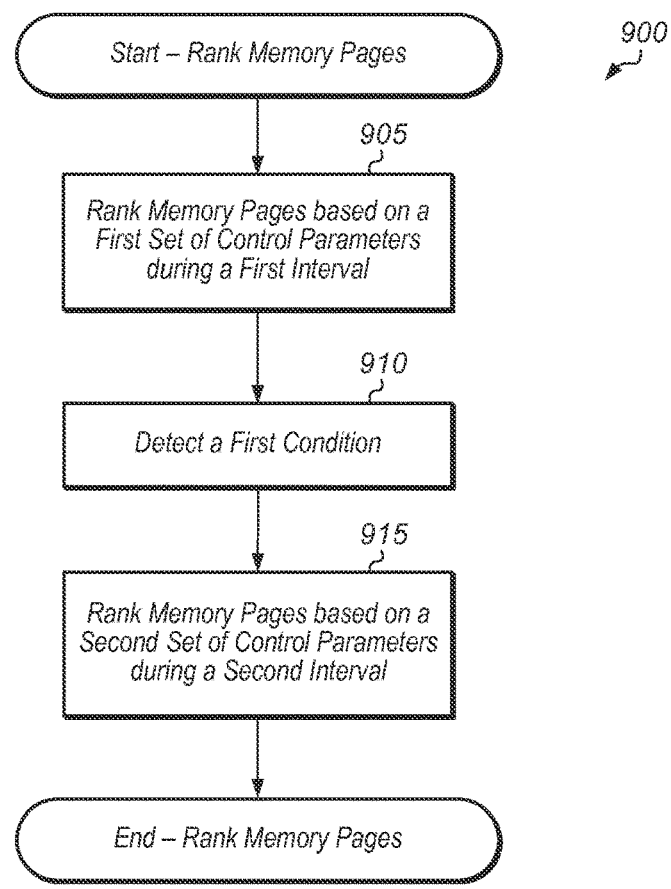
FIG. 9 is a generalized flow diagram illustrating one embodiment of a method for ranking memory pages in a system with a multi-level heterogeneous memory architecture (HMA).

Referring now to FIG. 9, one embodiment of a method 900 for ranking memory pages in a system with a multi-level heterogeneous memory architecture is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 900.

A controller on a system with a multi-level heterogeneous memory architecture may rank memory pages based on a first set of control parameters during a first interval (block 905). Depending on the embodiment, the controller may be implemented using any combination of software and/or hardware. The first set of control parameters may include one or more of the threshold 'q', the difference between the number of hot pages and the size of the first memory level, the number of accesses per page, the type of accesses per page, power consumption of the accesses per page, wearability of one or more memory levels, and/or other parameters. Next, the controller may detect a first condition (block 910). Depending on the embodiment, the first condition may be a trace analyzer making a prediction with a high degree of confidence, a change in performance, a change in system status, a change in temperature, a change in power consumption, or other condition. In response to detecting the first condition, the controller may rank memory pages based on a second set of control parameters during a second interval, wherein the second set of control parameters is different from the first set of control parameters, and wherein the second interval is subsequent to the first interval (block 915). After block 915, method 900 may end.

Figure 10:
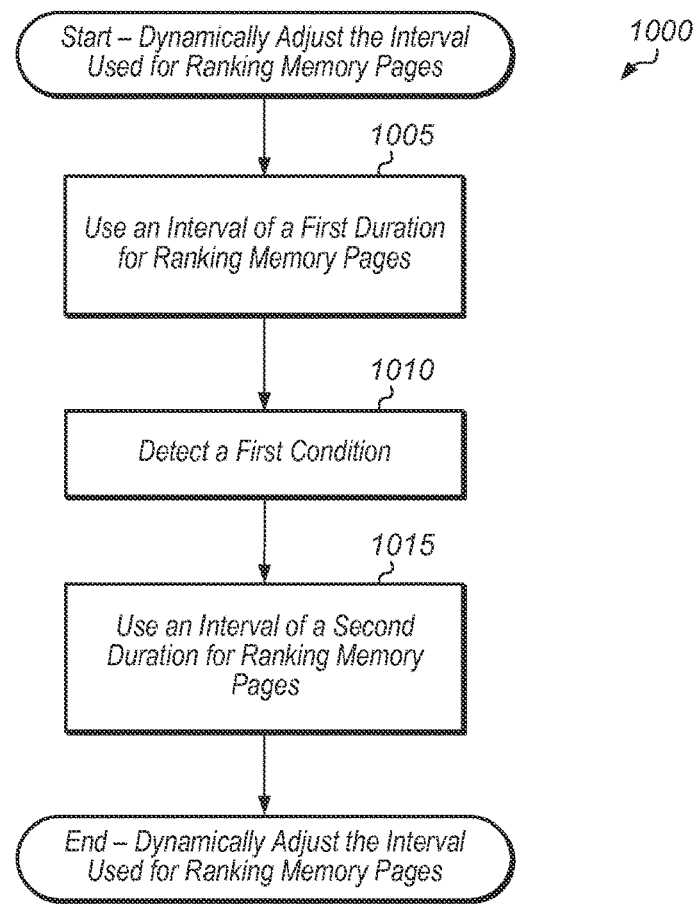
FIG. 10 is a generalized flow diagram illustrating one embodiment of a method for dynamically adjusting the duration of the interval used for ranking memory pages in a system with a multi-level heterogeneous memory architecture (HMA).

Turning now to FIG. 10, one embodiment of a method 1000 for dynamically adjusting the duration of the interval used for ranking memory pages in a system with a multi-level heterogeneous memory architecture is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 1000.

A controller on a system with a multi-level heterogeneous memory architecture may use an interval of a first duration for ranking memory pages (block 1005). Depending on the embodiment, the controller may be implemented using any combination of software and/or hardware. Next, the controller may detect a first condition (block 1010). Depending on the embodiment, the first condition may be a trace analyzer making a prediction with a high degree of confidence, a change in performance, a change in system status, a change in temperature, a change in power consumption, or other condition. In response to detecting the first condition, the controller may use an interval of a second duration for ranking memory pages, wherein the second duration is different from the first duration (block 1015). After block 1015, method 1000 may end.

Figure 11:
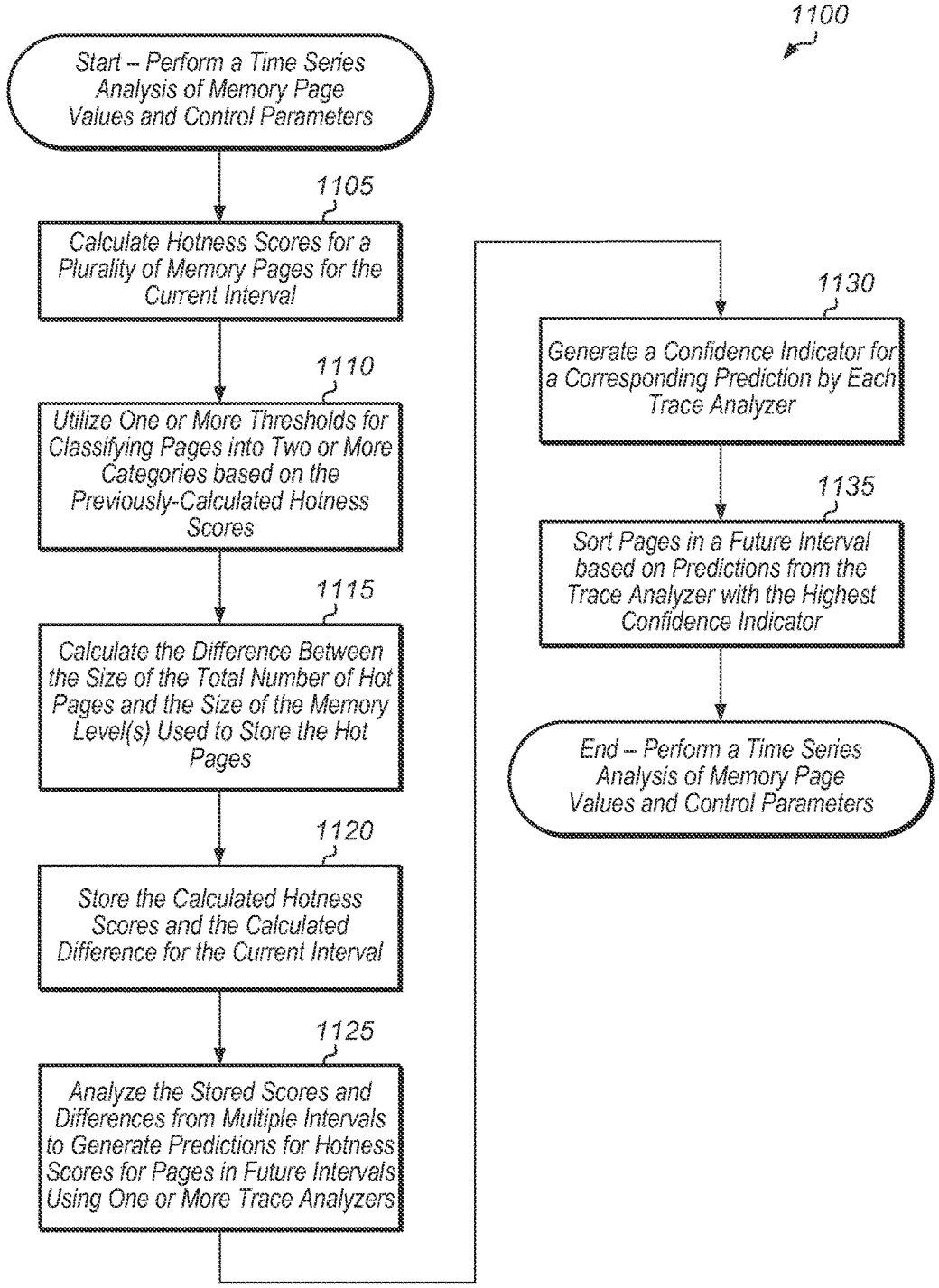
FIG. 11 is a generalized flow diagram illustrating one embodiment of a method for performing a time series analysis of memory page values and control parameters in a system with a multi-level heterogeneous memory architecture (HMA).

Referring now to FIG. 11, one embodiment of a method 1100 for performing a time series analysis of memory page values and control parameters in a system with a multi-level heterogeneous memory architecture is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 1100.

A controller on a system with a multi-level memory hierarchy may determine scores for a plurality of memory pages stored in the system for the current interval (block 1105). The controller may be implemented using any combination of software and/or hardware. Depending on the embodiment, the score may be calculated based on a single factor or based on multiple factors. Also, controller may utilize one or more thresholds for classifying pages into two or more categories based on the previously-calculated scores (block 1110).

Next, the controller may calculate the difference between the size of the total number of hot pages and the size of the memory level(s) which will be utilized for storing the hot pages (i.e., first memory level) (block 1115). Then, the controller may store the calculated scores and the calculated difference for the current interval (block 1120). In other embodiments, the controller may also store additional control parameters associated with the page scores, system status, and page assignment policies being utilized for the current interval. Next, one or more trace analyzers may analyze the stored scores and differences from multiple intervals to generate predictions for hotness scores for pages in future intervals (block 1125). Depending on the embodiment, the trace analyzers may be implemented using any combination of software and/or hardware. In one embodiment, a given trace analyzer may perform a time series analysis on the scores and differences from multiple prior intervals. Also, each of the one or more trace analyzers may generate a confidence indicator for a corresponding prediction (block 1130). Next, the controller may sort memory pages in a future interval based on the predictions from the trace analyzer with the highest confidence indicator (block 1135). In one embodiment, sorting may comprise placing the memory pages with the highest predicted scores in the memory level(s) closest to the processor cores of the system. After block 1135, method 1100 may end.

Figure 12:
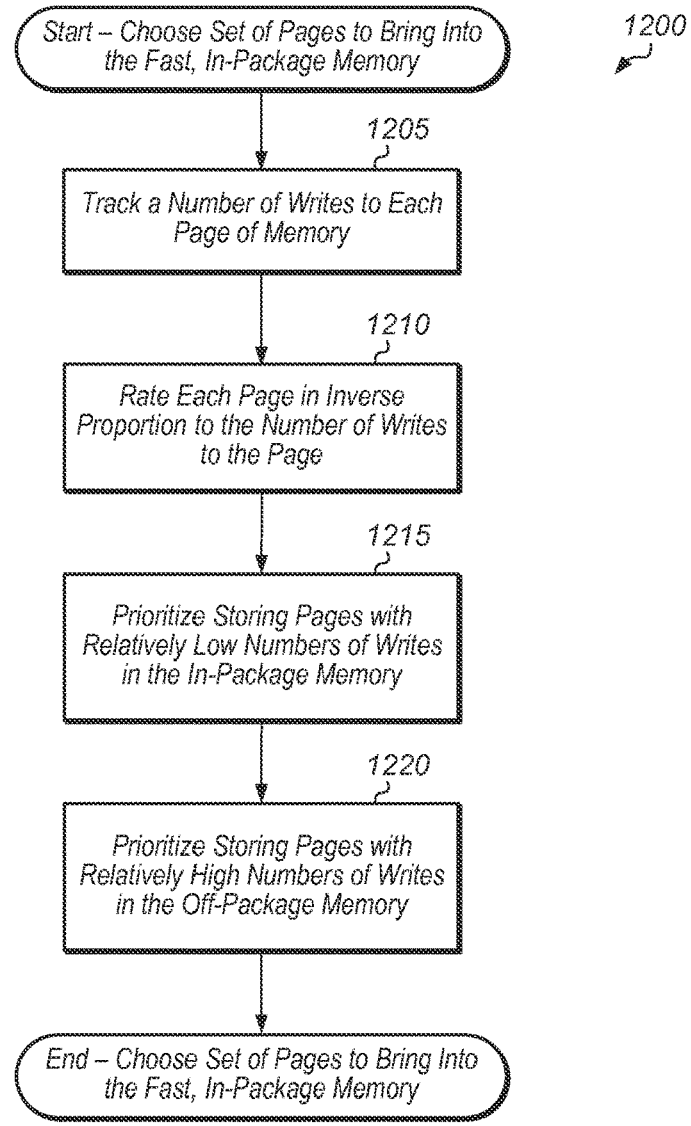
FIG. 12 is a generalized flow diagram illustrating one embodiment of a method for choosing a set of pages to bring into the fast in-package memory of a multi-level memory hierarchy.

Turning now to FIG. 12, one embodiment of a method 1200 for choosing a set of pages to bring into the fast in-package memory of a multi-level memory hierarchy is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 1200.

A controller on a system with a multi-level heterogeneous memory architecture (HMA) may track a number of writes to each page of memory (block 1205). In one embodiment, the HMA may include at least an in-package memory and an off-package memory. In various embodiments, the in-package memory may have lower latency than the off-package memory. In one embodiment, the in-package memory may be a non-volatile memory (NVM).

Next, the controller may rate each page in inverse proportion to the number of writes to the page (block 1210). Then, the controller may prioritize storing pages which have relatively low numbers of writes in the in-package memory (block 1215). The controller may prioritize storing pages which have relatively high numbers of writes in the off-package memory (block 1220). After block 1220, method 1200 may end.

In one embodiment, the controller may use a single threshold for determining which pages to bring into the in-package memory. In this embodiment, if a first page has a number of writes which is less than the threshold, then the OS may bring the first page into the in-package memory. On the other hand, if a second page has a number of writes which is greater than the threshold, then the OS may prevent the second page from being brought into the in-package memory, and instead may keep the second page in the off-package memory.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
   determining, by a processor, a value for each memory page of a plurality of memory pages based on one or more factors;
   determining, by the processor for each memory page of the plurality of memory pages, in which level of a multi-level memory hierarchy to store a given memory page based at least in part on a corresponding value of the given memory page;
   utilizing a first threshold to determine which memory pages are hot in a first interval, wherein a first page with a first value greater than the first threshold is designated as hot and wherein a second page with a second value less than the first threshold is designated as cold;
   in response to determining a size of a number of memory pages designated as hot is greater than a size of a first memory level of the multi-level memory hierarchy, for each memory page of the plurality of memory pages in a second interval subsequent to the first interval:
      designating a given page as hot in response to determining a value of the given page is greater than a second threshold, wherein the second threshold is greater than the first threshold; and
      designating the given page as cold in response to determining the value of the given page is less than the second threshold;
   prioritizing storing, by the processor, pages designated as hot in a first memory level of the multi-level memory hierarchy, wherein the processor accesses the first memory level with lower latency than other memory levels of the multi-level memory hierarchy; and
   storing pages designated as hot in the first memory level in preference to pages that are not designated as hot.

2. The method as recited in claim 1, wherein the processor accesses the first memory level with lower power consumption than other memory levels of the multi-level memory hierarchy.

3. The method as recited in claim 2, wherein the first memory level is a closest memory level to one or more cores of a processor.

4. The method as recited in claim 1, wherein said one or more factors comprise one or more of a number of accesses to a memory page and a type of access to a memory page.

5. The method as recited in claim 1, wherein the values are calculated based at least in part on a number of detected write accesses to corresponding memory pages, and wherein a first number of detected write accesses to a page designated as hot is greater than a second number of detected write accesses to a page designated as cold.

6. The method as recited in claim 1, further comprising:
calculating a difference between a number of hot memory pages and a size of the first memory level in the first and second intervals;
storing values for the plurality of memory pages and the difference for the first and second intervals;
analyzing the values and the difference to generate predictions for future values for the plurality of memory pages in a future interval; and
sorting the plurality of memory pages in the future interval based on the predictions of the future values.

7. The method as recited in claim 1, further comprising:
determining the value for each memory page of the plurality of memory pages based on a first set of control parameters during the first interval;
detecting a first condition; and
determining the value for each memory page of the plurality of memory pages based on a first set of control parameters during the second interval responsive to detecting the first condition, wherein the second set of control parameters are different from the first set of control parameters.

8. A system comprising:
a plurality of memory levels;
a processor coupled to the plurality of memory levels, wherein the processor is configured to:
determine a value for each memory page of a plurality of memory pages based on one or more factors;
determine, for each memory page of the plurality of memory pages, which memory level of the plurality of memory levels to store a given memory page based on a corresponding value of the given memory page;
utilize a first threshold to determine which memory pages are hot in a first interval, wherein a first page with a first value greater than the first threshold is designated as hot and wherein a second page with a second value less than the first threshold is designated as cold;
in response to determining a size of a number of memory pages designated as hot is greater than a size of a first memory level of the multi-level memory hierarchy, for each memory page of the plurality of memory pages in a second interval subsequent to the first interval:
designate a given page as hot in response to determining a value of the given page is greater than a second threshold, wherein the second threshold is greater than the first threshold; and
designate the given page as cold in response to determining the value of the given page is less than the second threshold;
prioritize storing pages designated as hot in a first memory level of the multi-level memory hierarchy, wherein the processor accesses the first memory level with lower latency than other memory levels of the multi-level memory hierarchy; and
store pages designated as hot in the first memory level in preference to pages that are not designated as hot.

9. The system as recited in claim 8, wherein the processor accesses the first memory level with lower power consumption than other memory levels of the multi-level memory hierarchy.

10. The system as recited in claim 9, wherein the first memory level is a closest memory level to the processor.

11. The system as recited in claim 8, wherein said one or more factors comprise an amount of energy consumed accessing a page.

12. The system as recited in claim 8, wherein the values are calculated based at least in part on a number of detected write accesses to corresponding memory pages, and wherein a first number of detected write accesses to a page designated as hot is greater than a second number of detected write accesses to a page designated as cold.

13. The system as recited in claim 8, wherein the processor is further configured to:
calculate a difference between a number of hot memory pages and a size of the first memory level in the first and second intervals;
store values for the plurality of memory pages and the difference for the first and second intervals;
analyze the values and the difference to generate predictions for future values for the plurality of memory pages in a future interval; and
sort the plurality of memory pages in the future interval based on the predictions of the future values.

14. The system as recited in claim 8, wherein the processor is further configured to:
determine the value for each memory page of the plurality of memory pages based on a first set of control parameters during the first interval;
detect a first condition; and
determine the value for each memory page of the plurality of memory pages based on a first set of control parameters during the second interval responsive to detecting the first condition, wherein the second set of control parameters are different from the first set of control parameters.

15. A non-transitory computer readable storage medium storing program instructions, wherein the program instructions are executable by a processor to:
determine a value for each memory page of a plurality of memory pages based on one or more factors;
determine, for each memory page of the plurality of memory pages, which level of a multi-level memory hierarchy to store a given memory page based on a corresponding value of the given memory page;
utilize a first threshold to determine which memory pages are hot in a first interval, wherein a first page with a first value greater than the first threshold is designated as hot and wherein a second page with a second value less than the first threshold is designated as cold;
in response to determining a size of a number of memory pages designated as hot is greater than a size of a first memory level of the multi-level memory hierarchy, for each memory page of the plurality of memory pages in a second interval subsequent to the first interval:
designate a given page as hot in response to determining a value of the given page is greater than a second threshold, wherein the second threshold is greater than the first threshold; and
designate the given page as cold in response to determining the value of the given page is less than the second threshold;

prioritize storing pages designated as hot in a first memory level of the multi-level memory hierarchy, wherein the processor accesses the first memory level with lower latency than other memory levels of the multi-level memory hierarchy; and store pages designated as hot in the first memory level in preference to pages that are not designated as hot.

16. The non-transitory computer readable storage medium as recited in claim 15, wherein the processor accesses the first memory level with lower power consumption than other memory levels of the multi-level memory hierarchy.

17. The non-transitory computer readable storage medium as recited in claim 16, wherein the first condition comprises detecting a number of memory pages designated as hot is greater than a size of the first memory level, and wherein the second threshold is greater than the first threshold.

18. The non-transitory computer readable storage medium as recited in claim 15, wherein said multi-level memory hierarchy includes a first memory with a limited number of write cycles; and the program instructions are executable by a processor to attempt to put pages in the first memory which have a fewest number of write accesses.

19. The non-transitory computer readable storage medium as recited in claim 15, wherein the values are calculated based at least in part on a number of detected write accesses to corresponding memory pages, and wherein a first number of detected write accesses to a page designated as hot is greater than a second number of detected write accesses to a page designated as cold.

20. The non-transitory computer readable storage medium as recited in claim 15, wherein the program instructions are further executable by a processor to:

calculate a difference between a number of hot memory pages and a size of the first memory level in the first and second intervals;

store values for the plurality of memory pages and the difference for the first and second intervals;

analyze the values and the difference to generate predictions for future values for the plurality of memory pages in a future interval; and sort the plurality of memory pages in the future interval based on the predictions of the future values.

* * * * *